United States Patent [19]

Takagi et al.

[11] Patent Number: 4,879,704

[45] Date of Patent: Nov. 7, 1989

[54] OPTICAL DISK, OPTICAL DISK RECORDING AND REPRODUCING APPARATUS AND COPY PREVENTIVE METHOD FOR OPTICAL DISKS

[75] Inventors: Yuuji Takagi, Kadoma; Isao Satoh, Neyagawa; Makoto Ichinose, Sakai; Yoshihisa Fukushima, Osaka; Yuzuru Kuroki, Toyonaka, all of Japan

[73] Assignee: Matsushita Electric Industrial Co., Ltd., Kadoma, Japan

[21] Appl. No.: 74,291

[22] Filed: Jul. 16, 1987

[30] Foreign Application Priority Data

Jul. 21, 1986 [JP] Japan .................................. 61-171231

[51] Int. Cl.⁴ ........................ G11B 11/12; G11B 23/28
[52] U.S. Cl. .......................................... 369/14; 369/59; 369/48; 369/58; 360/60
[58] Field of Search .................. 369/14, 59, 47, 48, 369/49, 54, 58; 360/60

[56] References Cited

U.S. PATENT DOCUMENTS

| 4,562,577 | 12/1985 | Glover et al. | 369/54 |
| 4,583,208 | 4/1986 | Verboom | 369/59 |
| 4,599,717 | 7/1986 | Bracht et al. | 369/59 |
| 4,734,796 | 3/1988 | Grynberg et al. | 360/60 |
| 4,734,901 | 3/1988 | Murakami | 369/59 |
| 4,748,611 | 5/1988 | Tsuyoshi et al. | 369/59 |

FOREIGN PATENT DOCUMENTS 60-145501 8/1985 Japan .
60-175254 9/1985 Japan .
0129427 12/1984 United Kingdom .................. 360/60

OTHER PUBLICATIONS

IEEE Spectrum, vol. 23, No. 6, Jun. 1986, pp. 32–40.
IBM Tech. Dis. Bulletin, vol. 23, No. 2, Jul. 1980, pp. 554–555.

Primary Examiner—Alan Faber
Assistant Examiner—Hoa T. Nguyen
Attorney, Agent, or Firm—Stevens, Davis, Miller & Mosher

[57] ABSTRACT

In an optical disk system of the type including an optical disk for performing the recording and reproduction of data by use of a semiconductor laser and an optical disk recording and reproducing apparatus, an optical disk, optical disk recording and reproducing apparatus and copy preventive method for optical disks capable of preventing copying of the stored data from one optical disk on another. Irrespective of the kinds of optical disks, such as, read only-type optical disk, DRAW-type optical disk and erasable optical disk, each of the optical disks is provided in common with sectors from which data can be reproduced but not recorded on, i.e., data record-protected sectors and at least part of the stored data is stored in the record-protected sectors of the optical disk, thereby protecting the stored data from being recorded on the same address sectors of another recordable optical disk forming a part of the optical disk system.

6 Claims, 6 Drawing Sheets

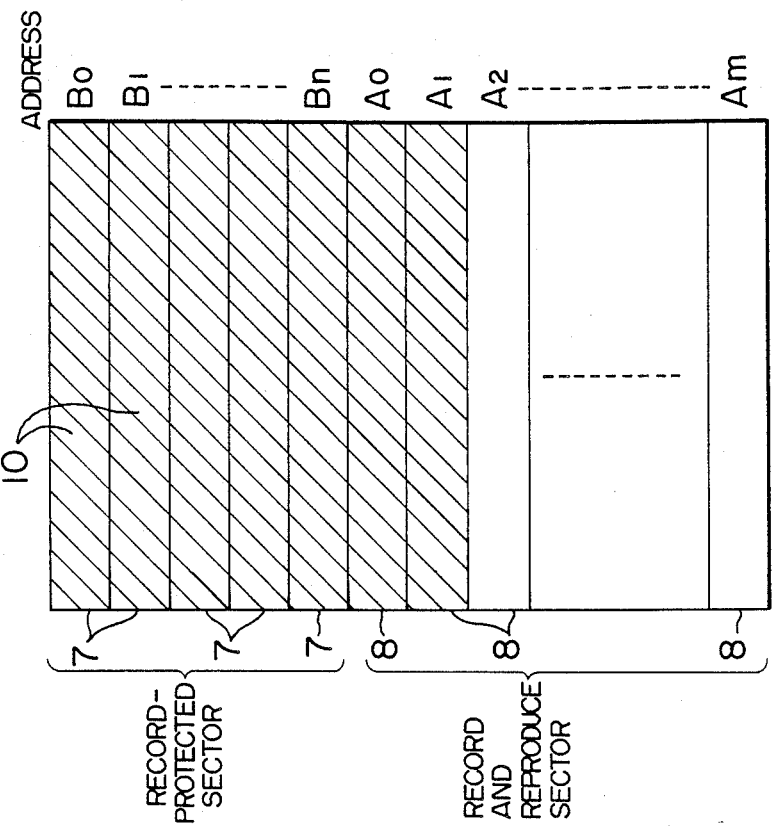
F I G. 4
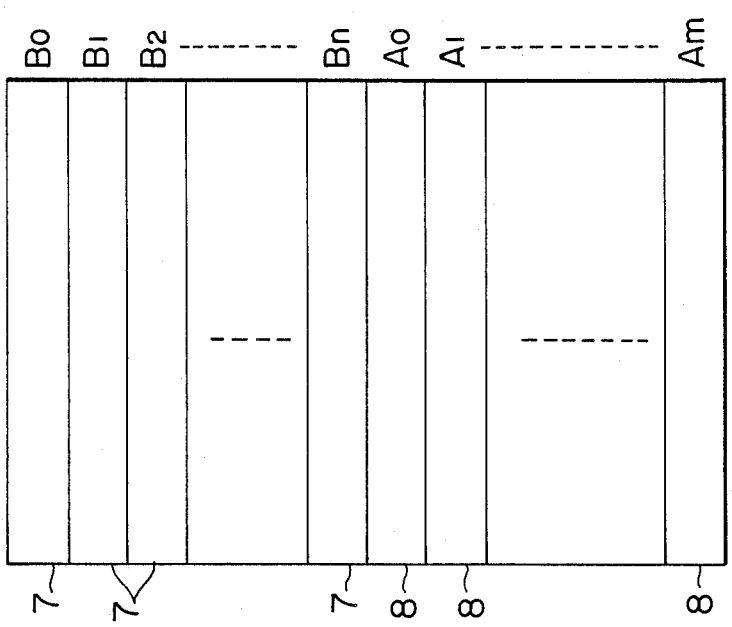
F I G. 3

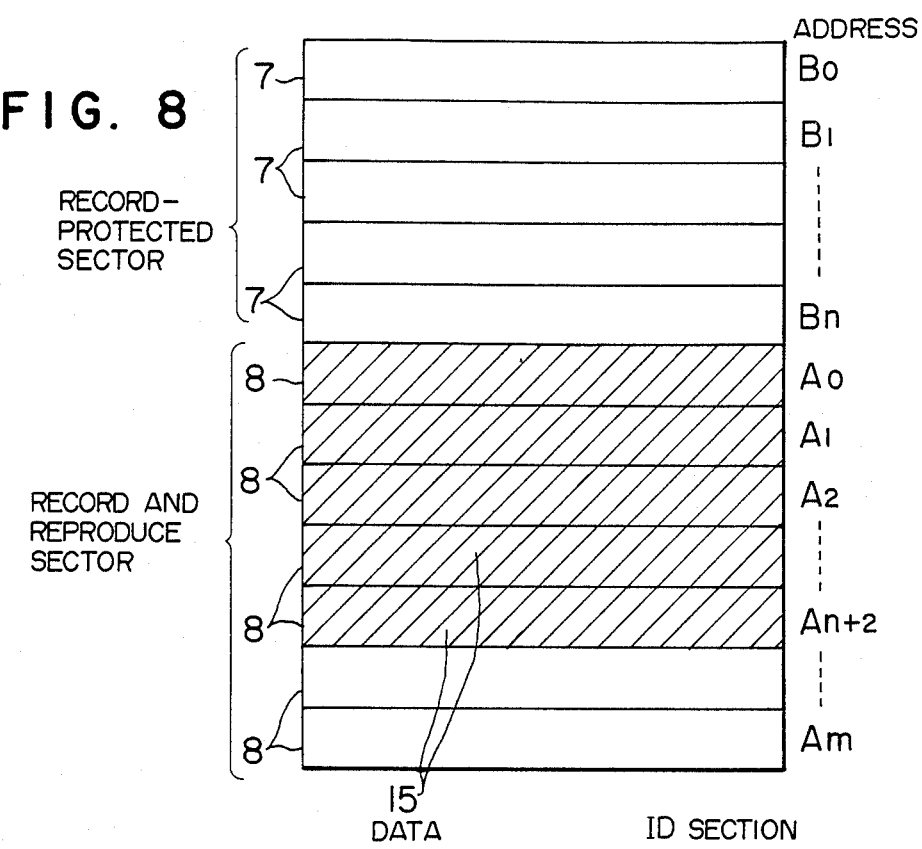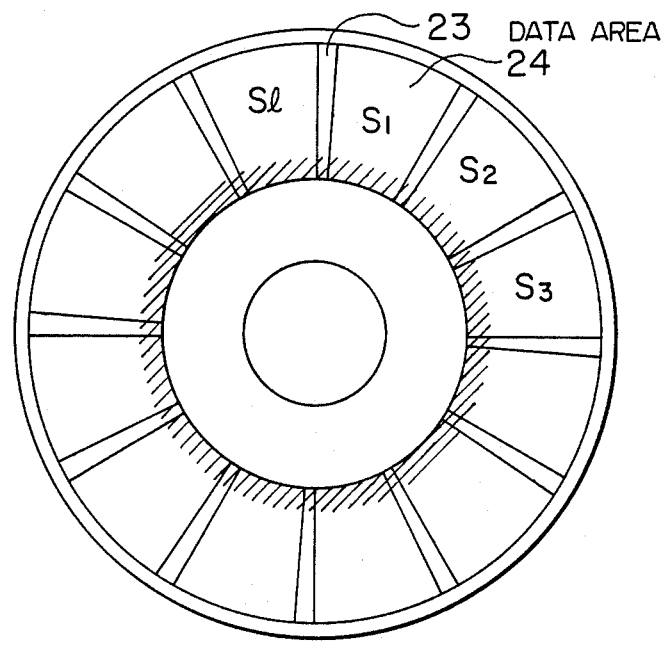

OPTICAL DISK, OPTICAL DISK RECORDING AND REPRODUCING APPARATUS AND COPY PREVENTIVE METHOD FOR OPTICAL DISKS

BACKGROUND OF THE INVENTION

1. FIELD OF THE INVENTION

The present invention relates to an optical disk of the type in which the recording and reproduction of data are effected by using a semiconductor laser, an optical disk recording and reproducing apparatus and a copy preventive method for an optical disk which are capable of protecting the stored data from being copied on another optical disk.

2. DESCRIPTION OF THE RELATED ART

The importance of software has been greatly recognized due to the recent popularization of personal computers, work stations, etc. As a result, various methods have been proposed for the purpose of protecting the software, e.g., commercially available programs and data bases recorded on recording mediums are protected from being copied onto other recording mediums.

The copy preventive methods heretofore proposed in the art include, for example, copy preventive methods of a software key type in which the length of each software recording sector is altered intentionally and other copy preventive methods of a hardware key type such as disclosed in Japanese Unexamined Pat. Nos. 60-145501 and 60-175254 in which defects such as unalterable flaws or holes are formed on a recording medium and their position information or pattern is discriminated.

However, the copy prevented methods of the software key type have generally the disadvantage of easy decoding, and various apparatus capable of cleverly copying copy-protected software have already been available commercially. Thus, the methods of this type have substantially failed to provide effective protection.

Also, the copy preventive methods of the hardware key type are disadvantageous in that a software supplier is required to perform a hardware treatment on a recording medium for every software, that is the formation of a hardware key by a physical treatment, e.g., the formation of flaws or holes or the removal of a part of a recording material, and this results in an increased manufacturing cost. Particularly, in the case of an optical disk, the formation of such a hardware key itself is not easy due to the complicated manufacturing process of the optical disk.

SUMMARY OF THE INVENTION

In view of the above and the fact that the easiest way of copying the data stored on an optical disk featuring a large capacity is disk-to-disk copying and that the possibility of an ordinary user possessing a plurality of optical disk systems is low because of the cast, it is an object of the present invention to provide an optical disk, optical disk recording and reproducing apparatus and copy preventive methods for optical disks capable of preventing the copying of data from one optical disk on another in the same optical disk system.

In accordance with the invention, there is provided an optical disk, optical disk recording and reproducing apparatus and a copy preventive method for optical disks in which at least part of the data is stored on the sectors of an optical disk from which the data can be but cannot be recorded on or record-protected sectors for data so that the data stored on the record-protected sectors cannot be recorded on the same address sectors of another optical disk.

By virtue of this construction, when the data stored on an optical disk by a software supplier is to be copied on another optical disk, the data stored on the record-protected sectors cannot be recorded on the sectors of the same address so that the copying is effected only in such a manner that the copied data has a missing portion incomplete software cannot operate properly, thereby substantially preventing copying by the ordinary user.

BRIEF DESCRIPTION OF THE DRAWINGS

FIG. 3 is a diagram showing the sectors of an optical disk used with the optical disk recording and reproducing apparatus according to the embodiment of Fig. 1.

FIG. 4 is a diagram showing the sectors of the optical disk according to the invention.

FIG. 8 is a diagram showing the optical disk sectors resulting from a copying operation avoiding the record-protected sectors.

FIG. 9 is an external view of the optical disk.

DESCRIPTION OF THE PREFERRED EMBODIMENTS

Figure 1:
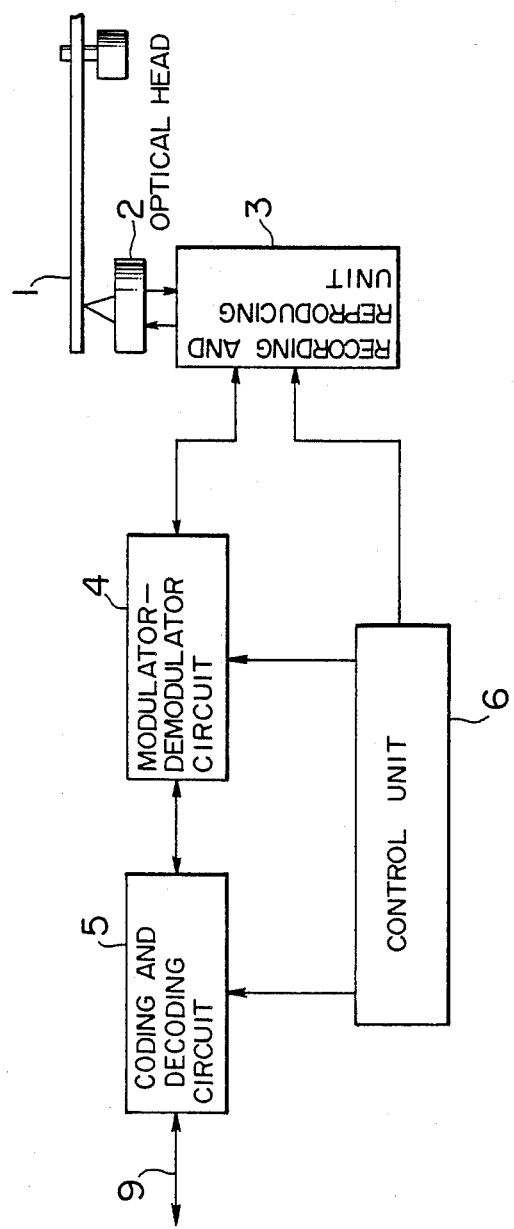
FIG. 1 is a block diagram of an optical disk recording and reproducing apparatus according to an embodiment of the invention.

FIG. 1 is a block diagram of an optical disk recording and reproducing apparatus used with embodiments of an optical disk and copy preventive method for optical disks according to the invention. In the Figure, numeral 1 designates an optical disk, 2 an optical head including a semiconductor laser, an optical lens, etc., 3 a recording and reproducing unit for driving the semiconductor laser 2 to effect the recording and reproduction of data, 4 a modulator-demodulator circuit for modulating an input signal to a form suitable for recording and demodulating the modulated signal, 5 a coding and decoding circuit for performing the operation of error detection-correction coding for error detecting and correcting purposes and the necessary decoding, and 6 a control unit including a microprocessor or the like for controlling the optical disk recording and reproducing apparatus on the whole.

Referring now to FIG. 9, there is illustrated an example of an optical disk used with the optical disk recording and reproducing apparatus according to the embodiment of the invention. In the Figure, numeral 23 designates ID sections, and 24 a data area for data recording purposes. Assuming that k represents a given positive integer, the tracks in concentric or spiral form are each divided into k sectors $S_l$ to $S_k$ and the ID section 23 just preceding each sector is preliminarily provided with an address format including a track address and a sector address. In the case of this optical disk, in the shaded portion of the Figure the ID sections 23 of the sectors are preliminarily formatted with addresses $B_0$ to $B_n$ with n representing a given positive integer, and in the portion other than the shaded portion the sectors are preliminarily formatted with addresses $A_0$ to $A_m$ with m representing a given positive integer.

FIG. 3 is a sector diagram of the optical disk shown in FIG. 9. If FIG. 3 shows the case of a read-only type optical disk, both of sectors 8 designated by addresses $A_0$ to $A_m$ and sectors 7 designated by $B_0$ to $B_n$ are record protected sectors and data is preliminarily stored in each of the sectors by a software supplier or the like. Also, in the case of a DRAW (direct read after write) type optical disk the sectors 8 of the addresses $A_0$ to $A_m$ show record and reproduce sectors and the ordinary user can record and reproduce data from these sectors by use of the optical disk recording and reproducing apparatus according to this embodiment. On the other hand, the sectors 7 of the addresses $B_0$ to $B_m$ are used as record-protected sectors and thus the ordinary user is unable to record data on these sectors. In the optical disk system including the optical disk recording and reproducing apparatus and the optical disk according to the invention, the sectors 7 of the addresses $B_0$ to $B_n$ are used as record-protected sectors irrespective of the type of the optical disk, that is, whether it is a read only-type optical disk, DRAW-type optical disk, erasable optical disk or combination-type optical disk of the former. The sectors 8 of the addresses $A_0$ to $A_m$ are hereinafter referred to as record and reproduce sectors and the sectors 7 of the addresses $B_0$ to $B_n$ as record-protected sectors.

Using the optical disk of the above-described construction, the operation of the optical disk recording and reproducing apparatus according to the present embodiment, shown in FIG. 1, will now be described. The optical disk recording and reproducing apparatus according to the embodiment can use either of a read only-type optical disk and a DRAW-type optical disk. When an installed optical disk 1 is a DRAW type optical disk, the recording of data is effected in such a manner that if m represents a given positive integer and if the addresses of the sectors to be recorded are $A_0$ to $A_m$ the control unit 6 sends a record command to each of the coding and decoding circuit 5, the modulator-demodulator circuit 4 and the recording and reproducing unit 3. Data 9 to be recorded is coded for error detection and correction purposes by the coding and decoding circuit 5, modulated to a signal form suitable for recording by the modulator-demodulator circuit 4 and then recorded on the sectors to be recorded by the recording and reproducing unit 3 through the optical head 2. However, if the addresses of the sectors to be recorded are other than $A_0$ to $A_m$, the control unit 6 determines that these addresses are invalid ones and a series of recording operations are not performed. Also, the series of the recording operations are not performed if the installed optical disk 1 is a read only-type optical disk.

On the other hand, the reproduction of data is effected in such a manner that where the installed optical disk 1 is either a read only-type optical disk or DRAW-type optical disk and m and n represent given positive integers, if the addresses of the sectors to be read are either $A_0$ to $A_m$ or $B_0$ to $B_n$, the control unit 6 sends a reproduce command to each of the coding and decoding circuit 5, the modulator-demodulator circuit 4 and the recording and reproducing unit 3. The recording and reproducing unit 3 projects through the optical head 2 the laser beam from the semiconductor laser on the record pits recorded in the form of recess-type pits or dots of varying intensities so that the signal resulting from the reflected beam is converted to a binary form and the resulting reproduced signal is sent to the modulator-demodulator circuit 4. The reproduced signal, preliminarily modulated to the signal suitable for recording during the recording, is demodulated by the modulator-demodulator circuit 4 and then subjected to the operation of error detection and correction by the coding and decoding circuit 5, thus reproducing the signal as the data 9. On the contrary, if the addresses of the sectors to be read are other than $A_0$ to $A_m$ or $B_0$ to $B_n$, the control unit 6 determines that these addresses are invalid ones and thus the series of reproducing operations are not performed.

Figure 2:
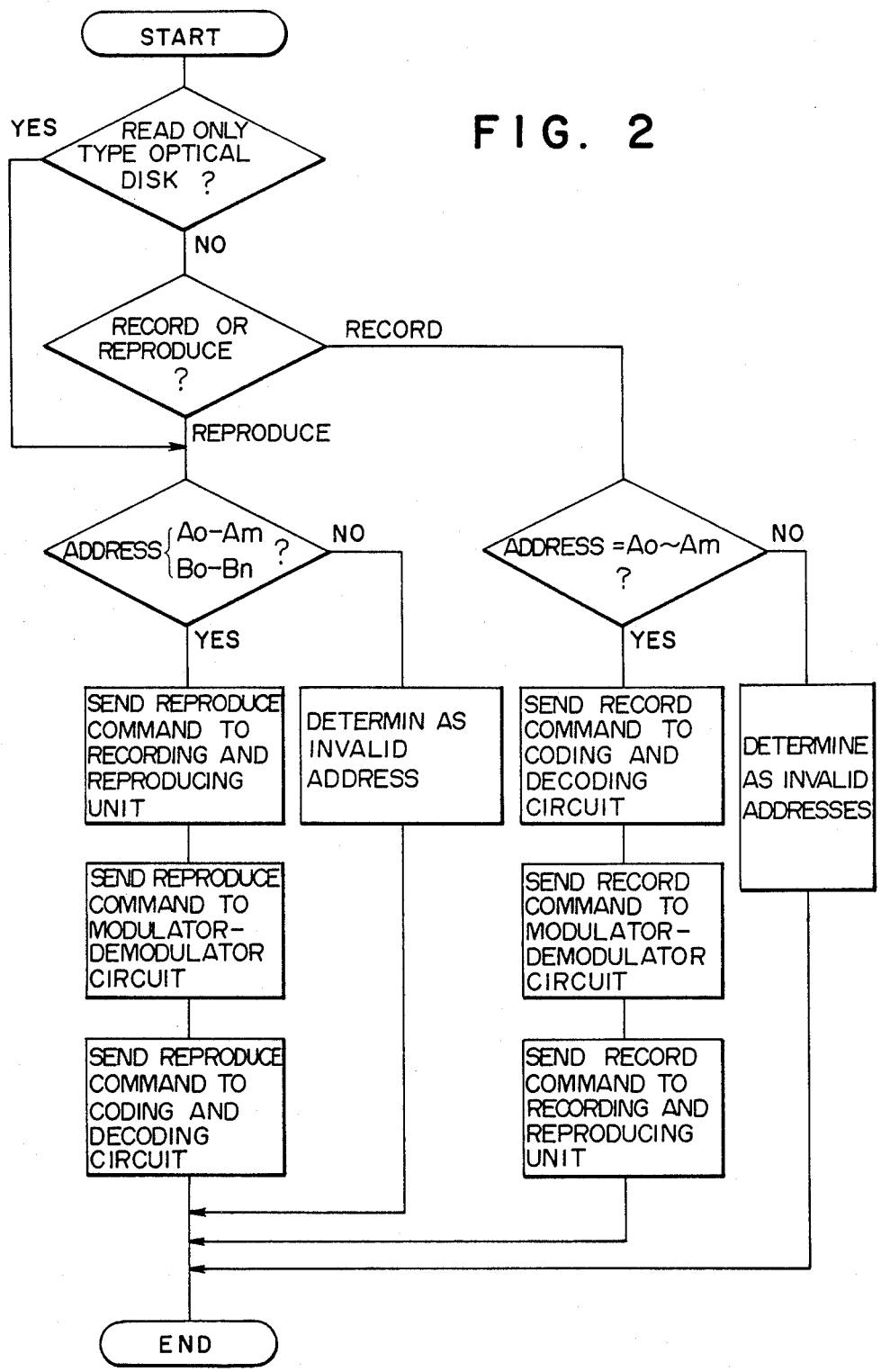
FIG. 2 is a flow chart showing the operation of the control unit in the embodiment of FIG. 1.

Referring to FIG. 2, there is illustrated the flow of the above-described operations of the control unit 6 in the optical disk recording and reproducing apparatus according to the embodiment of the invention. Note that the operations of the control unit 6 are written for example in the form of a microprogram for a microprocessor and it is practically impossible for the ordinary user to alter it.

Let it be assumed that the optical disk system including the optical disk recording and reproducing apparatus and the optical disk according to the embodiment of the invention are designed so that irrespective of the type of the optical disk, e.g., whether it is a DRAW-type optical disk or read only-type optical disk, the ordinary user is allowed only to reproduce but cannot record on the sectors designated by the addresses $B_0$ to $B_n$ and no apparatus capable of recording data on the sectors of the addresses $B_0$ to $B_n$ is available commercially.

FIG. 4 shows the read only-type optical disk used in the embodiment of the invention.

In the Figure, numeral 7 designates record-protected sectors which allow only the reproduction of data, 8 record and reproduce sections which allow both the recording and reproduction of data if the optical disk is of the DRAW-type and which allows only the reproduction of data if the optical disk is of the read only-type, and 10 the data stored by a software supplier and adapted to become effective only when the sectors designated by physical addresses $B_0, B_1, \ldots, B_n, A_0, A_1$ are reproduced sequentially. In addition, the addresses of the respective sectors have been preliminarily formatted. Assume that the data stored in the read only-type optical disk of the above-mentioned construction is copied on another optical disk of the DRAW type.

Figure 5:
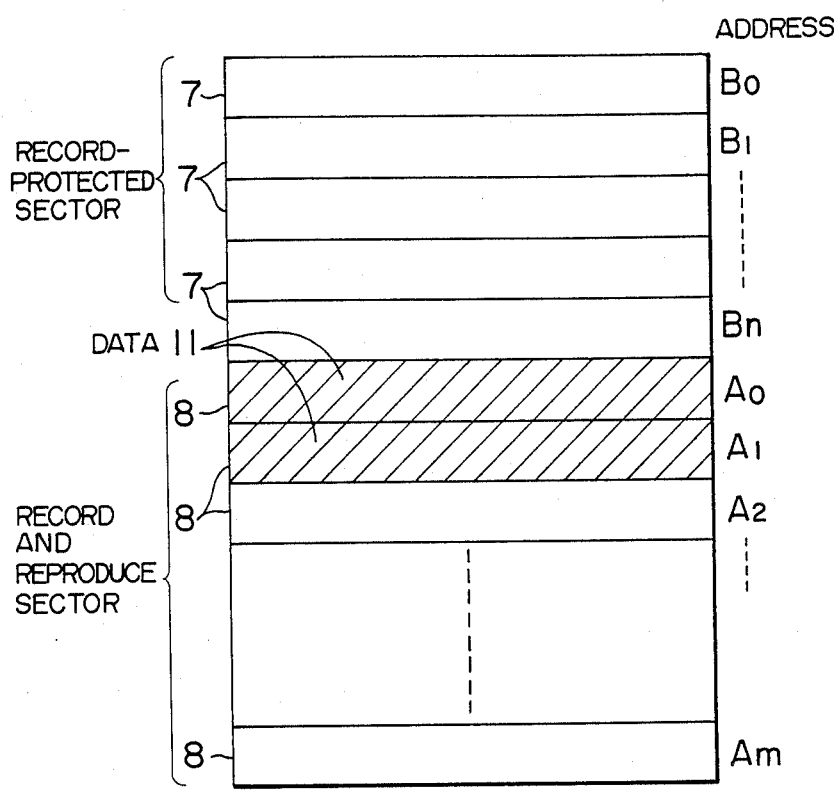
FIG. 5 is a diagram showing the optical disk sectors resulting from the copying of the optical disk shown in FIG. 4.

FIG. 5 is a diagram showing the optical disk obtained as a result of this copying.

In the Figure, numeral 7 designates record-protected sectors which allow only the reproduction of data, 8 record and reproduce sectors which allow both the recording and reproduction of data, and 11 that portion of the data 10 of FIG. 4 which has been copied. In other words, of the data 10 stored on the sectors of the addresses $B_0$ to $B_n$, $A_0$ and $A_1$ by the software supplier, only the portion stored in the sectors of the addresses $A_0$ and $A_1$ has been copied and the copying of the data stored in the sectors of the addresses $B_0$ to $B_n$ was unsuccessful since the sectors of the addresses for recording are the record-protected sectors. As a result, the copied data 11 is incomplete and hence incapable of operating normally, thereby preventing the copying of the data 10 stored by the software supplier.

Figure 6:
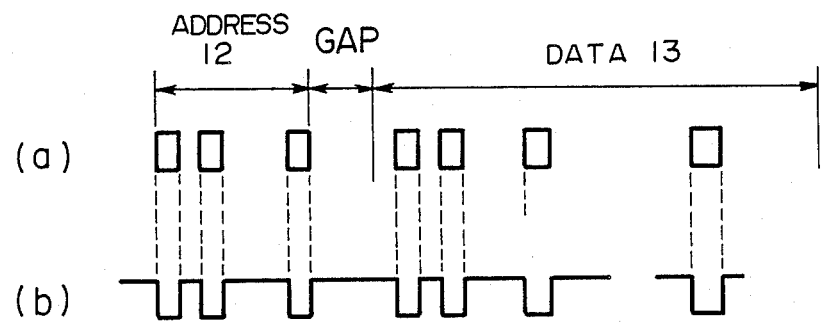
FIG. 6 is a diagram showing by way of example the manner in which data is stored in the record-protected sectors.

The storage of the data 10 will now be described. FIG. 6 shows the manner in which data is stored in the sectors forming record-protected sectors.

FIG. 6 is a diagram showing the sector in which data has been stored by recording it in the form of recess-type or hole-type pits, with (a) showing a plan view of the optical disk and (b) showing a sectional view of the optical disk. Numeral 12 designates the addresses preliminarily recorded in the form of recess-type or hole-type pits, and 13 the data recorded in the form of pits by the same means as the addresses 12.

Then, in the case of the record protected sectors, the characteristics of the optical disk recording coating itself need not necessarily be protected from recording and in addition data can be recorded on the record protected sectors by the use of different kinds of methods, such as, the photomagnetic type or the dot recording type utilizing the variations in reflectance and transmittance Irrespective of the method used to store the data on the record-protected sectors, the copy preventive method for optical disks according to the embodiment of the invention can be used effectively. In this case, however, the software supplier stores data on the optical disk by a special optical disk recording apparatus, such as, a stamper which does not belong to the protect optical disk system and is not available commercially and the optical disk recording and reproducing apparatus according to the embodiment of this invention is not used. This special optical disk recording apparatus, e.g., stamper is expensive and also it is not available commercially but is possessed by the manufacturer of the optical disk in question. Thus, practically there is no danger of the software being used by stealth by use of such recording apparatus.

From the foregoing it will be seen that in accordance with the optical disk and the copy preventive method for optical disks according to the embodiment of the invention, by virtue of the fact that at least part of data is simply stored on the record protected sectors, even if copying of the data is effected, the data stored on the record protected sectors is not recorded and only a part of the data is copied. Since such an incomplete software cannot operate properly, there is the effect of preventing the copying from one optical disk on another.

Figure 7A:
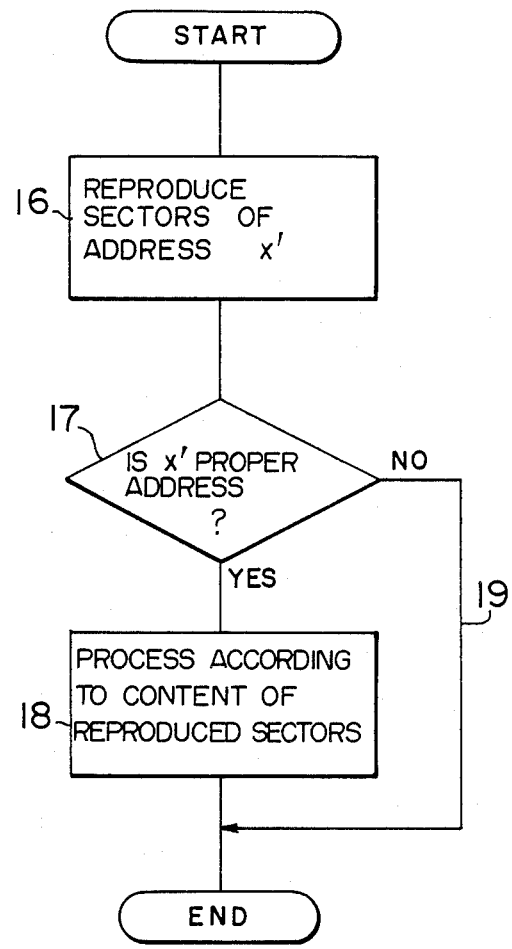
FIGS. 7A and 7B show exemplary flow charts for the data stored on the optical disk.
Figure 7B:
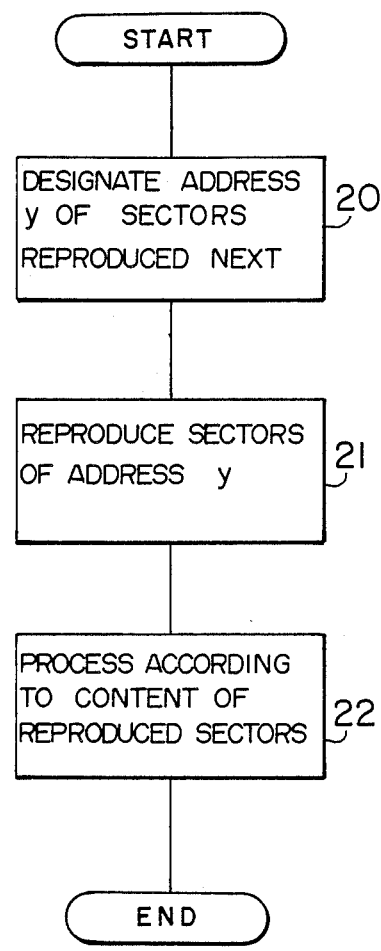

FIGS. 7A and 7B are flow charts respectively showing a case where in the above-described embodiment the stored data forms a program which operates on a computer, includes as a part thereof a physical address x of the sectors in which the program is stored and also includes a copy preventive process such that the physical address x included in the read program is compared with the physical address x' of the sectors previously storing the program to allow the subsequent operation of the program only when the two match with each other and a case where similarly the stored data forms a program which operates on a computer and the program includes as a part thereof the physical address y of the sectors to be read next as a program. In FIG. 7A, the copy preventive process including the following series of steps is built in at least part of the data stored.

Step 16: The data is reproduced from the sectors designated by the physical address x'.

Step 17: A decision is made as to whether the physical address x' matches the physical address x included in the program.

Step 18: When the data is reproduced from the proper sectors, x = x' results and the process corresponding to the data contents of the reproduced sectors is performed.

Step 19: When the reproduction of the proper sectors is not effected, the protect processing is ended without performing any process.

Also, in FIG. 7B, addressing means including the following series of steps is built in at least part of the data stored.

Step 20: The physical address y of the sectors to be reproduced next is designated as data.

Step 21: The data is reproduced from the sectors designated by the physical address y.

Step 22: The process corresponding to the contents of the reproduced sectors is performed.

Assume now that a person intending to use the data by stealth copies all of the data 10 of FIG. 4 by shifting wholly the data of addresses $B_0$ to $A_1$ into the sections of addresses $A_0$ to $A_{(n+2)}$ as shown in the shaded part of FIG. 8. At this time, in the case of FIG. 7A the reproduction of the sectors designated by the addresses $A_0$ to $A_{(n+2)}$ in FIG. 8 results in that the addresses $A_0$ to $A_{(n+2)}$ differ from the sectors of the proper addresses $B_0$ to $A_1$ and hence are determined to be different from the proper addresses, thereby performing no process corresponding to the reproduced data. As a result, practically the copying of the data ends in a failure. Also, in the case of FIG. 7B, in FIG. 8, for example, despite the fact that the data in the sector of the physical address $A_1$ must be read following the sector of the physical address $A_0$, the data recorded on the sector of $A_0$ is the one which should have essentially been recorded on the sector of $B_0$ and thus it is commanded to reproduce next the sector of the physical address $B_0$. Thus, in this case, the sector of $B_1$ is in effect read and the copied data is useless, thus substantially preventing the copying of the data.

As described hereinabove, since it is so designed that it is effective only when the stored data is read from the proper sectors, even if the copying is effected by avoiding the record protected sectors, it results in a failure and a higher degree of copy prevention is realized, thereby ensuring a greater effect than previously.

In addition, while, in the optical disk, the optical disk recording and reproducing apparatus and the copy preventive method for optical disks according to the embodiment of the invention, the record-protected sections and the record and reproduce sections are given in terms of sectors, it is of course possible to represent the sections in terms of other units such as tracks. Further, while, the optical disk recording and reproducing apparatus according to the embodiment of the invention is designed to perform the recording and reproduction of data on a read only-type optical disk or DRAW-type optical disk, it does not matter even if the optical disk system according to the present embodiment includes an optical disk recording and reproducing apparatus capable of recording and reproducing data from any other optical disk such as an erasable optical disk including its record-protected sections in the same address sections as the optical disk according to the present embodiment.

From the foregoing description it will be seen that the present invention is designed to function so that when copying the data from one optical disk on another, the data is stored in the area of another optical disk which is different from that of the original optical disk, that is, at least part of the data is stored in the record-protected sectors to prevent copying of the data from one optical disk on another. Thus, the present invention has a great practical effect.

What is claimed is:

1. An optical disk recording and reproducing apparatus for recording and reproducing data from an optical disk divided into a plurality of sectors each thereof being preliminarily formatted with an address with m and n each representing a given positive integer, said apparatus comprising:

means for only reproducing data from said optical disk sectors respectively designated by addresses $B_0$ to $B_n$; and means for recording and reproducing data from said optical disk sectors respectively designated by addresses $A_0$ to $A_m$, said sectors designated by said addresses $B_0$ to $B_n$ serving as record-protected sectors and being adapted for the reproduction of data only irrespective of said optical disk comprising a read only-type optical disk, a DRAW-type optical disk or an erasable optical disk, whereby data having at least part thereof recorded on said record protected sectors designated by said addresses $B_0$ to $B_n$ is protected from being recorded on the same address sectors of another recordable optical disk.

2. An optical disk having a program stored thereon and comprising a plurality of sectors each preliminarily formatted with an address, said optical disk being adapted for use with an optical disk recording and reproducing apparatus adapted, with m and n each representing a given positive integer, to perform only reproduction and no recording of data located on said sectors designated by addresses $B_0$ and $B_n$ and to perform recording and reproduction of data located on said sectors designated by addresses $A_0$ and $A_m$, said sectors designated by addresses $B_0$ to $B_n$ being record-protected sectors, said optical disk having a program stored thereon which operates on a computer, at least past of said program being stored on said sectors designated by addresses $B_0$ to $B_n$, said program including as a part thereof a physical address of each of said sectors on which said program is recorded, said program including a copy preventive process operating such that when said program is read, the physical addresses included in said program are compared with the physical addresses of said sectors previously storing said program to allow the subsequent operation of said program only when there is equality therebetween.

3. An optical disk having a program stored thereon and comprising a plurality of sectors preliminarily formatted with an address, said optical disk being adapted for use with an optical disk recording and reproducing apparatus adapted, with m and n each representing a given positive integer, to perform only reproduction and no recording of data located on said sectors designated by addresses $B_0$ and $B_n$ and to perform the recording and reproduction of data located on said sectors designated by addresses $A_0$ to $A_m$, said sectors designated by addresses $B_o$ to $B_n$ being record-protected sectors, said optical disk having a program stored thereon which operates on a computer, at least part of said program being stored in said sectors designated by said addresses $B_0$ to $B_n$, said program including the physical addresses of said sectors to be read next as a program as a part thereof.

4. A copy protection method for an optical disk comprising the steps of:

providing an optical disk divided into a plurality of sectors, each formatted with an address, said sectors including a first group of sectors designated by respective addresses $A_0$ to $A_m$, and a second group of sectors designated by respective addresses $B_o$ to $B_n$, where m and n are each positive integers, said sectors designated by addresses $B_0$ to $B_n$ serving as data record-protection sectors and being adapted for only reproduction of data;

recording at least part of a body of stored data in said record-protected sectors $B_0$ to $B_n$;

reading said optical disk with an optical disk recording and reproducing apparatus, said apparatus operating to reproduce only and not record data obtained from optical disk sectors designated by addresses $B_0$ to $B_n$ and operating to record and reproduce data from said optical disk sectors designated by addresses $A_0$ to $A_m$, said apparatus operating so that said at least a part of said body of data contained in sectors designated as $B_0$ to $B_n$ is not recordable on the same sector addresses of another optical disk by said apparatus.

5. A copy preventive method according to claim 4, wherein said body of stored data comprises a program which operates on a computer, wherein said program includes as a part thereof a physical address of each of said sectors in which said program is stored, and wherein said program includes a copy preventive process whereby when said program is read, said physical addresses included in said program are compared with the physical addresses of said sectors previously storing said program to allow the subsequent operation of said program only when there is equality therebetween.

6. A copy preventive method according to claim 4 wherein said body of stored data comprises a program which operates on a computer, and wherein said program includes in at least a portion thereof the physical addresses of said sectors to be read next as a part thereof.

* * * * *